July 23, 1968  P. G. HOLLINS  3,393,775
DISCS FOR DISC BRAKES
Original Filed Aug. 17, 1964  2 Sheets-Sheet 1
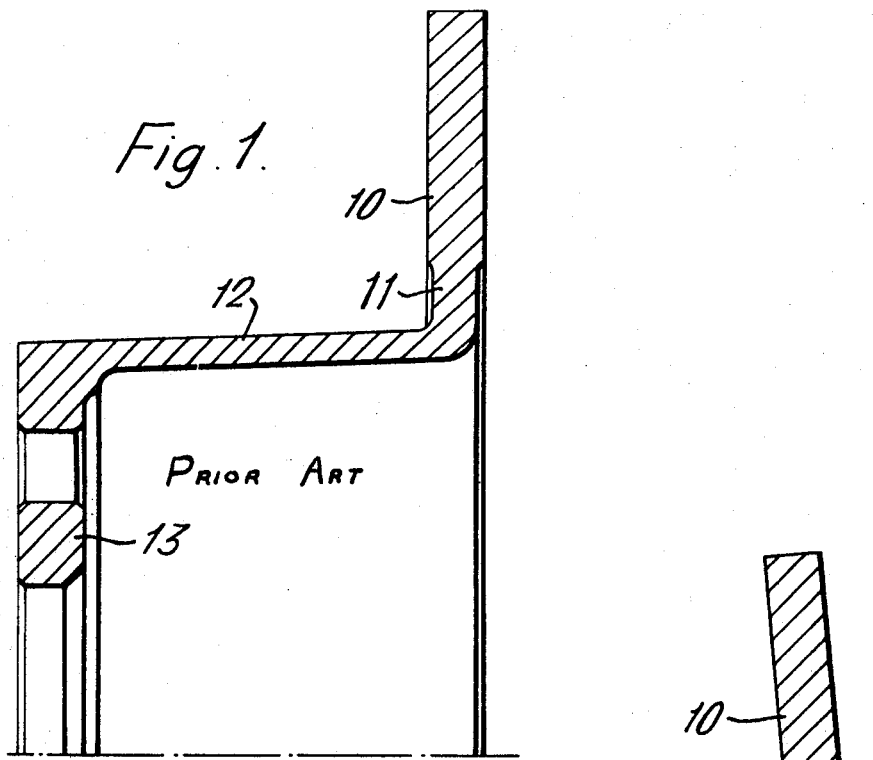
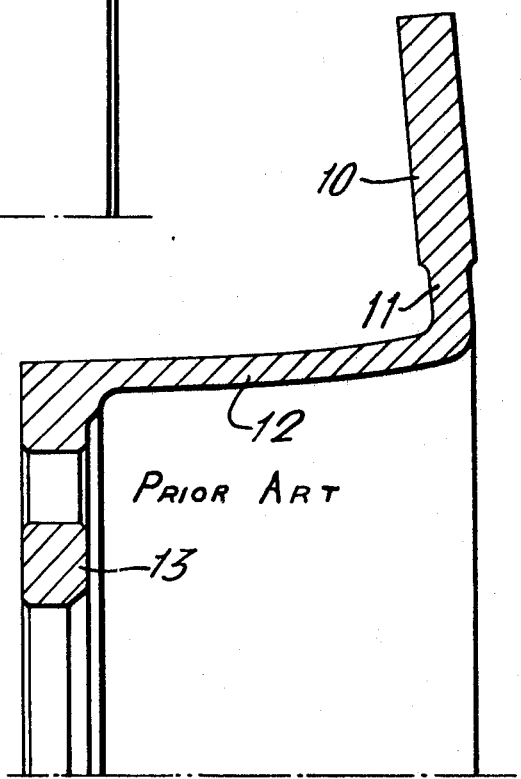

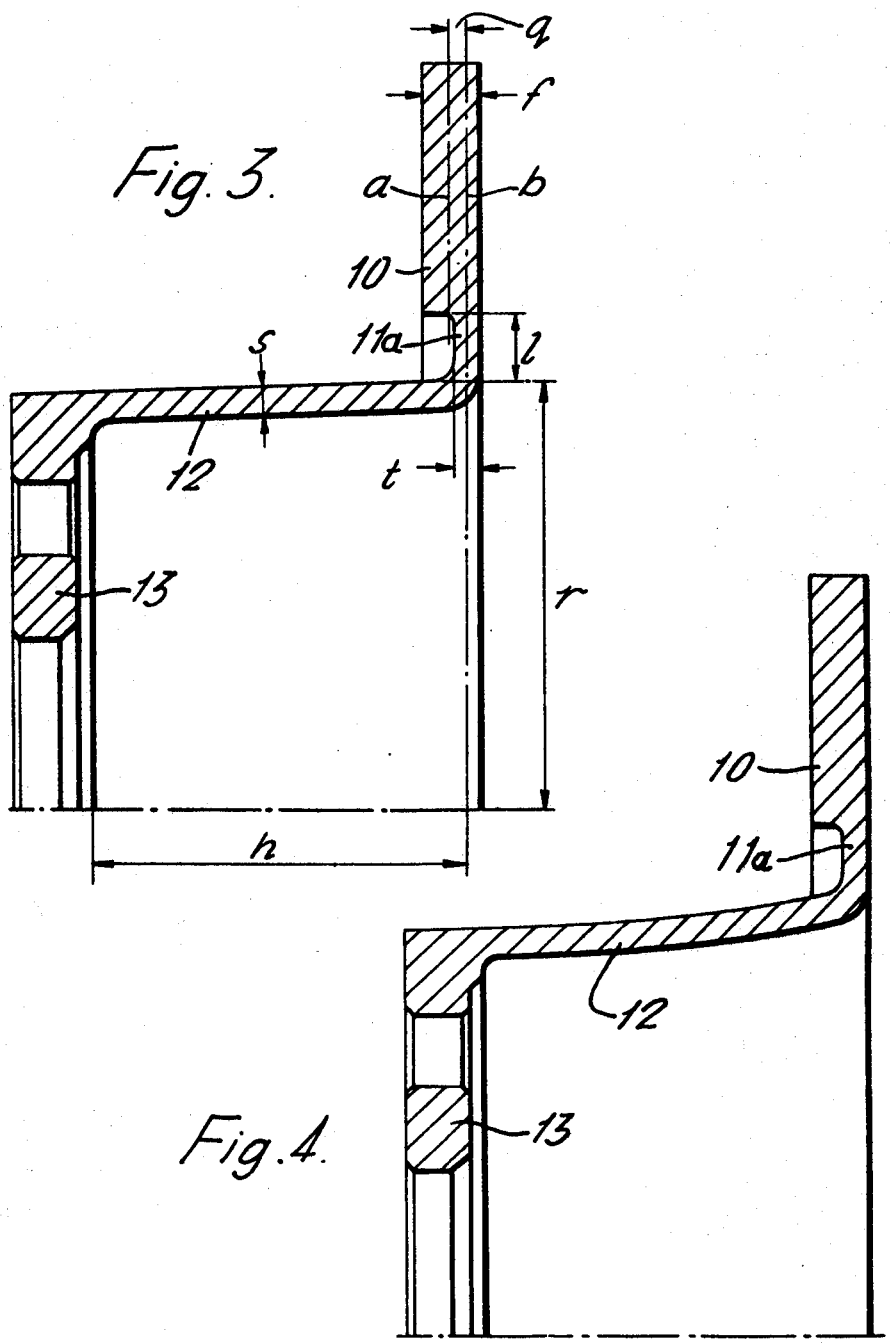

United States Patent Office 3,393,775
Patented July 23, 1968

3,393,775
DISCS FOR DISC BRAKES
Peter George Hollins, Coventry, England, assignor to Girling Limited, Tyseley, England, a British company
Application Aug. 17, 1966, Ser. No. 580,133, which is a continuation of application Ser. No. 390,004, Aug. 17, 1964. Divided and this application Oct. 24, 1966, Ser. No. 589,050
Claims priority, application Great Britain, Aug. 20, 1963, 28,826/63
2 Claims. (Cl. 188—218)

ABSTRACT OF THE DISCLOSURE

In a disc for disc brakes, wherein the disc comprises an annular flange at the outer end of a central bell attached at its inner end to a vehicle wheel, means for minimizing coning and axial movement of the braking flange due to heat of braking comprising the provision of an annular web interconnecting the outer end of the bell and the braking flange, the web having less thickness than the flange and having flat parallel faces terminating at the same distance from the axis of the bell, the center line of the web being offset in a direction away from the inner end of the bell with respect to the center line of the flange.

---

This is a division of Ser. No. 580,133 filed Aug. 17, 1966, which is a continuation of Ser. No. 390,004 filed Aug. 17, 1964.

This invention relates to discs for disc brakes.

A common form of disc comprises a generally cylindrical part extending in the direction of rotational axis of the disc and having at one end a radially extending annular flange providing braking surfaces and at the other means such as an inwardly extending radial flange for attachment to a rotatable part such as a vehicle wheel.

When the disc becomes heated on application of the brake, the annular braking flange expands radially outwardly and the axially extending part expands most at the braking flange end. This causes the braking flange to distort to the form of a shallow cone.

In a disc brake in which friction pads are applied to opposite faces of the braking flange by pistons working in hydraulic cylinders the "coning" of the flange causes the flange-engaging surfaces of the friction pads to wear to an inclined form. Also, the axial movement forces one piston back into its cylinder and requires the other piston to advance.

When the disc cools down after braking, the braking flange returns to its normal position with the result that the clearance between the centre of each pad and the flange is increased owing to the inclined direction of wear of the pads and, added to this, there is further excess clearance between one pad and the flange owing to the return axial movement of the flange, the other pad having been pushed back during this return axial movement. Subsequent operation of teh brake requires an excessive pedal travel and may lead to failure of the brake because of insufficient feed of fluid to the brake cylinders.

In a brake in which there is a movable housing incorporating a single hydraulic cylinder for applying one pad to the disc, the other pad being applied indirectly, the "coning" of the braking flange can cause excessive take-up of the limited clearance normally available between the flange and the pads with the result that the brake jams.

According to our invention a disc for a disc brake comprises a braking flange providing opposed braking surfaces and extending radially from one end of an axially extending part of a bell or equivalent member of substantial axial length adapted to be secured at the other end to a rotatable part such as a vehicle wheel, in which the bell is of substantially cylindrical form and the braking flange which is integral with the bell is connected to the open end of the bell by an annular web of less axial thickness than the flange, the web having flat parallel radial faces which both terminate at their outer ends at the same radial distance from the axis of the bell, and the central plane of the web being offset axially from that of the flange in a direction away from the anchored end of the bell.

In the accompanying drawings:

FIGURE 1 is a half-diametral section of a disc of normal construction, the section showing half of a disc taken in a plane containing the rotational axis of the disc, FIGURE 2 is a similar section of the same disc showing the form assumed by the disc when the braking flange is heated, FIGURE 3 is a similar section of a disc modified in accordance with our invention, and FIGURE 4 is a section showing the form assumed by the disc illustrated in FIGURE 3 when the braking flange is heated.

Each of the discs illustrated comprise a braking flange 10 providing opposed braking surfaces and extending radially from one end of a bell member adapted to be secured at its other end to a wheel or other rotatable part of a vehicle. The bell is of substantial axial length and the axially extending part 12 may be cylindrical or may be very slightly coned as shown in the drawing. At the end of the bell remote from the flange 10 there is an integral inwardly extending radial attachment flange 13 apertured to receive bolts for securing the bell to a wheel or the like.

The flange 10 which is integral with the bell is connected to the open end of the bell by an annular web 11.

In the disc shown in FIGURES 1 and 2 the web 11 is of an axial thickness only slightly less than that of the flange 10 and the central plane of the web coincides with that of the flange.

When a disc of this form is incorporated in a brake and the flange is heated by application of the brake the flange being a ring expands radially and increases in diameter. As the flange is rigidly connected by the web to the open end of the bell it necessarily takes that with it so that the open end of the bell increases in diameter as shown in FIGURE 2 and this expansion of the bell causes the flange to assume a shallow conical form as shown in the same figure. This gives rise to the difficulties discussed in the opening part of this specification.

In a disc according to our invention and as shown in FIGURE 3 the web 11a which connects the braking flange to the bell is of substantially less axial thickness than the flange and has flat parallel radial faces which both terminate at the same radial distance from the axis of the bell, and the central plane of the web is offset axially from that of the flange in a direction away from the anchored end of the bell.

The effect of this is that there is an offset moment arm tending to turn the flange about its connection with the bell in a direction away from the anchored end of the bell so that the flange is maintained substantially in a plane at right angles to the bell as shown in FIGURE 4 and its displacement other than radially is reduced to neglible proportions. The radial expansion of the open end of the bell shown in FIGURE 4 is the same as in FIGURE 2 but the amount of the expansion in each case is exaggerated for the purpose of illustration.

In FIGURE 3 of the drawing the central plane of the web is indicated at $a$ and the central plane of the braking flange at $b$. The extent of the offsetting of the plane $a$ from the plane $b$ is indicated at $q$. The radius of the axially extending part of the bell at its open end is indicated by $r$, the axial length of the bell by $h$, the radial thickness of the axially extending part of the bell by $s$, the axial thickness of the web by $t$, the radial length of the web by $l$ and the axial thickness of the braking flange by $f$.

In one example the values of those dimensions are as follows:

$q= .11''$
$r=2.814''$
$h=2.48''$
$s= .19''$
$t= .16''$
$l= .456''$
$f= .375''$

Our invention is of particular advantage where the bell is of an axial length of not less than 1½".

What is claimed is:

1. A disc for a disc brake comprising a bell member adapted to be secured at one end to a rotatable member such as a vehicle wheel and a flange providing braking surfaces and extending radially from the other end of said bell member, said flange being solid and carried from said bell member by an annular web of less axial thickness than the flange and said web having flat parallel radial faces which both terminate at their outer ends at the same radial distance from the axis of the bell member and the central plane of said web being offset axially from that of the flange in a direction away from said one end of the bell member.

2. A disc for a disc brake as in claim 1 wherein the axial length of said bell member is not less than 1½ inches.

References Cited

UNITED STATES PATENTS 3,120,882  2/1964  Maloney.
2,800,982  7/1957  Cottrell.

FOREIGN PATENTS 205,682  1/1957  Australia.
1,309,093  10/1962  France.

FERGUS S. MIDDLETON, *Primary Examiner.*

GEORGE E. A. HALVOSA, *Assistant Examiner.*